United States Patent
Fusco et al.

(10) Patent No.: US 10,635,763 B2
(45) Date of Patent: Apr. 28, 2020

(54) PERFORMING LAGRANGIAN PARTICLE TRACKING WITH ADAPTIVE SAMPLING TO PROVIDE A USER-DEFINED LEVEL OF PERFORMANCE

(71) Applicant: International Business Machines Corporation, Armonk, NY (US)

(72) Inventors: Francesco Fusco, Kildare (IE); Fearghal O'Donncha, Galway (IE); Emanuele Ragnoli, Chapelizod (IE)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 15/452,056

(22) Filed: Mar. 7, 2017

(65) Prior Publication Data

US 2018/0260499 A1 Sep. 13, 2018

(51) Int. Cl.
G06F 17/50 (2006.01)

(52) U.S. Cl.
CPC ...... G06F 17/5009 (2013.01); *G06F 2217/16* (2013.01)

(58) Field of Classification Search
None
See application file for complete search history.

(56) References Cited

U.S. PATENT DOCUMENTS

| | | |
|---|---|---|
| 8,831,916 B2 | 9/2014 | McDaniel et al. |
| 2011/0153299 A1 | 6/2011 | Kim et al. |
| 2011/0282641 A1 | 11/2011 | Xenos et al. |
| 2012/0316848 A1 | 12/2012 | Noh et al. |
| 2015/0120258 A1 | 4/2015 | Kang et al. |
| 2015/0161810 A1* | 6/2015 | Macklin ............ G06T 13/60 345/474 |
| 2015/0227651 A1 | 8/2015 | Gowaikar et al. |
| 2015/0242553 A1 | 8/2015 | Sun et al. |

OTHER PUBLICATIONS

Tang et al. "Numerical simulation of aerosol deposition from turbulent flows using three-dimensional RANS and LES turbulence models", Engineering Applications of Computational Fluid Mechanics, 9:1, 174-186. (Year: 2015).*

(Continued)

*Primary Examiner* — Suzanne Lo
(74) *Attorney, Agent, or Firm* — Scully, Scott, Murphy & Presser, P.C.; Kurt Goudy, Esq.

(57) ABSTRACT

A fluid is modeled as a set of discrete particles. Each of the particles is associated with one or more properties, and a spatial distance comprising a smoothing length over which the one or more properties are to be smoothed. A corresponding trajectory is simulated for each of the particles. The corresponding trajectory is used to formulate a first solution for simulating transport within the fluid. A first predicted error is determined for the first solution. An iterative adjustment is performed to at least one of: a quantity of particles, the smoothing length, or the one or more corresponding properties, to formulate a second solution for simulating transport with the fluid, and a second predicted error is determined for the second solution, until the second predicted error is within a predefined boundary.

20 Claims, 4 Drawing Sheets

(56) References Cited

OTHER PUBLICATIONS

Painter et al. "Time domain particle tracking methods for simulating transport with retention and first-order transformation", Water Resources Research, vol. 44, 11 pages. (Year: 2008).*
Fernandex-Garcia et al. "Optimal reconstruction of concentrations, gradients, and reaction rates from particle distributions", Journal of Contaminant Hydrology 120-121, pp. 99-114. (Year: 2011).*
Ihmsen et al. "SPH Fluids in Computer Graphics", EUROGRAPH-ICS 2014, 22 pages. (Year: 2014).*
Borve et al. "Regularized Smoothed Particle Hydrodynamics: A New Approach to Simulating Magnetohydrodynamic Shocks", Nov. 1, 2001, The Astrophysical Journal, 561:82-93. (Year: 2001).*
Garcia-Senz et al., "Equalizing resolution in smoothed-particle hydrodynamics calculations using self-adaptive sinc kernels", Astonomy & Astrophysics, vol. 570; Aug. 26, 2014, pp. 1-30.
Amicarelli et al.; Ttl: A Smoothed Particle Hydrodynamics model for 3D solid body transport in free surface flows; Publication Ttl: Computers & Fluids, vol. 116,; 2015; Publisher: Pergamon-Elsevier Science Ltd; Country of Publication: pp. 205-228.

\* cited by examiner

PERFORMING LAGRANGIAN PARTICLE TRACKING WITH ADAPTIVE SAMPLING TO PROVIDE A USER-DEFINED LEVEL OF PERFORMANCE

FIELD

The present disclosure relates generally to solving fluid transport problems and, more specifically, to performing Lagrangian particle tracking with adaptive sampling to provide a user-defined level of performance.

BACKGROUND

Precise and detailed predictions of fluid transport processes are required for a large number of applications. Fluid transport problems may arise in a wide variety of technical fields, such as determining pollutant dispersion in air or water, predicting renewable energy production capacity, and performing aquaculture management. Lagrangian particle tracking models represent a robust forecasting methodology that can be used for simulating a transport process within a fluid. Pursuant to Lagrangian particle tracking, pollutant mass is modeled using a set of particles. However, particle tracking accuracy is sensitive to a set of initial conditions including a user-specified number of particles, as well as a user-specified distribution for these particles. Properly configuring the Lagrangian particle tracking model requires substantial expertise and time-consuming trial-and-error simulation. Thus, there exists a need to overcome at least one of the preceding deficiencies and limitations of the related art.

SUMMARY

The following summary is merely intended to be exemplary. The summary is not intended to limit the scope of the claims.

A method for adaptively optimizing a smooth particle hydrodynamics procedure, in one aspect, comprises modeling a fluid as a set of n discrete particles, n being a positive integer; associating each of the discrete particles with one or more corresponding properties; associating each of the discrete particles with a corresponding spatial distance comprising a smoothing length over which the one or more corresponding properties are to be smoothed; for each respective particle of the discrete particles, simulating a corresponding trajectory; using the corresponding trajectory for each of the discrete particles to formulate a first solution for simulating transport within the fluid; determining a predicted error for the first solution; and iteratively and automatically adjusting at least one of: a quantity for n, the smoothing length, or the one or more corresponding properties, to formulate a second solution for simulating transport with the fluid until the predicted error is within a predefined, predetermined, or specified boundary.

A computer program product, in another aspect, comprises a computer-readable storage medium having a computer-readable program stored therein, wherein the computer-readable program, when executed on a computing device including at least one processor, causes the at least one processor to model a fluid as a set of n discrete particles, n being a positive integer; associate each of the discrete particles with one or more corresponding properties; associate each of the discrete particles with a corresponding spatial distance comprising a smoothing length over which the one or more corresponding properties are to be smoothed; for each respective particle of the discrete particles, simulate a corresponding trajectory; use the corresponding trajectory for each of the discrete particles to formulate a first solution for simulating transport within the fluid; determine a predicted error for the first solution; and iteratively and automatically adjust at least one of: a quantity for n, the smoothing length, or the one or more corresponding properties, to formulate a second solution for simulating transport with the fluid until the predicted error is within a predefined, predetermined, or specified boundary.

An apparatus for adaptively optimizing a smooth particle hydrodynamics procedure, in another aspect, comprises a processor and a non-transitory computer-readable memory coupled to the processor, wherein the memory comprises instructions which, when executed by the processor, cause the processor to: model a fluid as a set of n discrete particles, n being a positive integer; associate each of the discrete particles with one or more corresponding properties; associate each of the discrete particles with a corresponding spatial distance comprising a smoothing length over which the one or more corresponding properties are to be smoothed; for each respective particle of the discrete particles, simulate a corresponding trajectory; use the corresponding trajectory for each of the discrete particles to formulate a first solution for simulating transport within the fluid; determine a predicted error for the first solution; and iteratively and automatically adjust at least one of: a quantity for n, the smoothing length, or the one or more corresponding properties, to formulate a second solution for simulating transport with the fluid until the predicted error is within a predefined, predetermined, or specified boundary.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
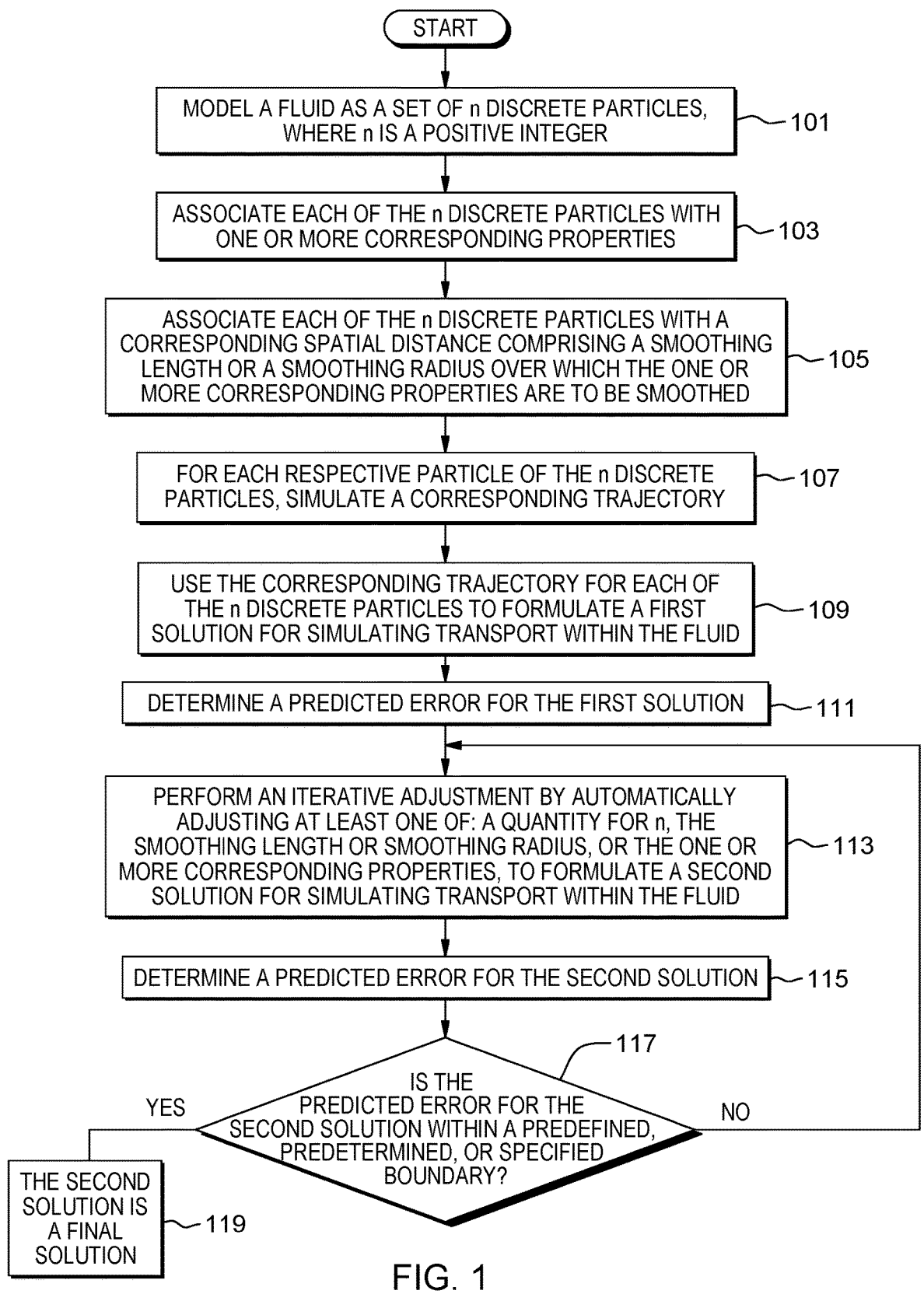
FIG. 1 illustrates a first exemplary method for adaptively optimizing a smooth particle hydrodynamics procedure, in accordance with one or more embodiments of the present invention.

In computational fluid dynamics, Lagrangian particle tracking (LPT) is a numerical technique for tracking the motion of Lagrangian particles. A particle is said to be Lagrangian when it moves as though it is an element of fluid. Some simulation cases for which this technique is applicable include physical matter such as sprays, small bubbles, dust particles, particulites, pollutants, chemical substances, and dilute multiphase flows. A Lagrangian particle at a location (x,y,z) may be conceptualized as the location of the center of mass of the fluid element. Individual particles are examined as they move through space and time.

The Lagrangian model may be used to represent physical matter using a plurality of points, often referred to as parcels or droplets. The more points, the more accurately the physical matter is represented. These points are then each assigned one or more properties. Some illustrative properties include location, velocity, diameter, mass, temperature and fuel composition. For example, a Lagrangian particle may have a specified mass and a label indicating a material, substance, or chemical that identifies the particle. These points are of zero dimension and do not occupy any space in a mathematical domain, and thus they serve to act as markers. The domain is conceptualized as including a grid comprising a set of cells. A set of Eulerian equations with interaction terms may be used to represent a gaseous phase of the physical matter. Accordingly, in the case of a spray, one must determine at which location or cell the liquid-to-gas exchange takes place, so that the interaction terms can be distributed in the correct position or positions.

Lagrangian particles are tracked through the domain, in which they move from cell to cell according to principles of distributed mass, momentum and energy. The points are used to move mass, momentum, and energy through the grid in a way that preserves the identities of one or more materials. There are no connections between particles, so they are free to move and follow the dynamics of a flow regardless of the complexity of the flow.

Smoothed-particle hydrodynamics (SPH) is a computational method for performing simulations of fluid flows. It has been used in many fields of research, including astrophysics, ballistics, volcanology, and oceanography. It is a mesh-free Lagrangian method where a set of reference coordinates moves with the fluid. The resolution of the method is adjustable with respect to variables such as particle density.

The SPH method includes an interpolation step, a smoothing step, and a time-integration step. The interpolation step works by modeling a fluid as a set of discrete elements, referred to as particles. Numerical Monte Carlo techniques are used to determine particle distribution and re-distribution. The particles have a spatial distance, known as a smoothing radius or a smoothing length, represented mathematically by h, over which their properties are "smoothed" during the smoothing step by a Kernel function W. The contributions of each particle to a property are weighted according to their distance from the particle of interest, and their density. This means that the physical quantity of any particle can be obtained by summing the relevant properties of all the particles which are situated within the range of the kernel. The interpolation and smoothing steps may be repeated iteratively and the results integrated over time.

Numerical Monte Carlo techniques comprise a broad class of computational algorithms that rely on repeated random sampling to obtain numerical results. The idea is to use randomness to solve problems that might be deterministic in principle. Monte Carlo methods generally involve defining a domain of possible inputs, generating inputs randomly from a probability distribution over the domain, performing a deterministic computation on the inputs, and aggregating the results.

Monte Carlo methods are often used to solve physical and mathematical problems, and are most useful when it is difficult or impossible to use other approaches to arrive at a solution. Monte Carlo methods can be used to solve any of three different types of problem classes: optimization, numerical integration, and generating draws from a probability distribution. In the context of physics-related problems, Monte Carlo methods are quite useful for simulating systems with many coupled degrees of freedom, such as fluids, disordered materials, strongly coupled solids, and cellular structures.

Some illustrative Kernel functions include a Gaussian function and a cubic spline. The latter function is exactly zero for particles further away than two smoothing lengths, unlike the Gaussian, where there is a small contribution at any finite distance away. The cubic spline has the advantage of saving computational effort by not including the relatively minor contributions from distant particles. For example, using a cubic spline kernel, a temperature of a particle at a position u depends upon the temperatures of all particles within a radial distance 2h of u.

As mentioned previously, SPH performs computational fluid simulation based on Monte Carlo methods. Internal forces are calculated between pairs of particles. For example, density is calculated as:

$$\rho^i_{\!f} f = m^f \Sigma W(r_{i,j}, h^f),$$

where i and j are neighbor particles, m is the mass, r is the radius, h is the smoothing radius limiting interaction to a range, and W is the Kernel function. Pressure force is calculated as:

$$F_i^{pressure} = -m^f \Sigma \{[(P^i_j + P^f_j) \nabla W(r_{ij}, h^f)]/2\rho^f_j\}.$$

Viscosity force is calculated as:

$$F_i^{viscosity} = m^f_\mu \Sigma \{[(v^f_j - v^f_i) \nabla^2 W(r_{ij}, h^f)]/\rho_j\}.$$

The forces are used to simulate advecting of the particles. Over multiple iterations, velocity is calculated as:

$$v_i^f(t+1/2) = v_i^f(t-1/2) + (a \Delta t),$$

and position is calculated as:

$$L_i^f(t) = L_i^f(t-1) + v_i^f(t+1/2) \Delta t.$$

Since only particles within the smoothing length, h, interact with each other, it is possible to avoid $O(n^2)$ calculations with all particles in the simulation. The need to simulate fluids at interactive speeds has further led to processor-based implementation. By dividing the simulation space into cells, each of diminution equal to the smoothing length h, it is possible to iterate over all of a particle's neighbors at an order of O(mn), where m is the average number of particles per cell. If particle i is located at a cell(x, y, z), i∈ cell (x, y, z), then a neighboring particle j belongs to cell(x, y, z) ∪ j∈ cell(x±1, y±1, z±1).

Although the size of the smoothing length h can be fixed in both space and time, this does not take advantage of the full power of SPH. By assigning each particle its own smoothing length, and allowing this smoothing length to vary with time, the resolution of a simulation can be made to automatically adapt itself in accordance with local conditions. For example, in a very dense region where many particles are close together, the smoothing length can be made relatively short, yielding high spatial resolution. Conversely, in low-density regions where individual particles are far apart and the resolution is low, the smoothing length can be increased, optimizing the computation for the regions of interest. Combined with an equation of state and an integrator, SPH can simulate hydrodynamic flows efficiently.

The Lagrangian-based adaptivity of SPH can be introduced by a number or quantity of particles, by changing smoothing lengths for each of a plurality of particles, by splitting one or more particles into 'daughter' particles with smaller smoothing lengths, or by using any of various combinations of the foregoing adjustments. The methods, apparatuses, and computer program products disclosed herein are configured for automatically tuning a selected number of particles n and the smoothing length h so as to achieve a desired or optimized compromise between a desired modeling accuracy (prediction error), resolution (the smoothing length h) and complexity (the number of particles n).

Lagrangian modeling and analysis may be performed using a special-purpose computer program. Some illustrative examples of suitable programs include Field Operation and Manipulation (FOAM), developed at Imperial College by H. Weller, and written in the C++ programming language. Another example is OpenFOAM, an open-source version of FOAM.

Lagrangian particle methods may require a significant amount of expertise and trial-and-error simulations in order to achieve accurate and useful results. Accuracy is sensitive to a set of initial conditions, a number of particles, and a distribution of particles, all of which are user-specifiable or adjustable parameters. By automatically initializing and iteratively refining a set of key simulation parameters based upon a desired level of accuracy of forecast and a desired level of computational complexity, the procedures, computer program products, and apparatuses described herein provide for efficient implementations of automatic Lagrangian model deployment, removing much of the burden of parameter selection and repeated iterations from the user.

FIG. 1 illustrates a first exemplary method for adaptively optimizing a smooth particle hydrodynamics procedure, in accordance with one or more embodiments of the present invention. The method commences at block 101 where a fluid is modeled as a set of n discrete particles, n being a positive integer. For purposes of illustration, numerical Monte Carlo techniques may be employed to determine a distribution for the discrete particles. These techniques utilize repeated random sampling to obtain numerical results. For example, a domain of possible inputs is defined, a plurality of sets of candidate inputs are generated randomly from a probability distribution over the domain, a deterministic computation is performed on each of the plurality of sets of candidate inputs to generate a plurality of deterministic computations, and the plurality of deterministic computations are aggregated aggregated to thereby yield the numerical results.

Next, at block 103, each of the discrete particles is associated with one or more corresponding properties. Some illustrative properties include location, velocity, diameter, mass, temperature, fuel composition, chemical composition, or an identifier corresponding to a pollutant. For example, a Lagrangian particle may have a specified mass and a label indicating a material, substance, or chemical that identifies the particle. These particles are of zero dimension and do not occupy any space in a mathematical domain, and thus they serve to act as markers.

The operational sequence progresses to block 105 where each of the discrete particles is associated with a corresponding spatial distance comprising a smoothing length or a smoothing radius over which the one or more corresponding properties are to be smoothed. The smoothing radius or smoothing length, represented mathematically by h, is a distance over which the properties of the particles are "smoothed" by the Kernel function W. The contributions of each particle to a property are weighted according to their distance from the particle of interest, and their density. This means that the physical quantity of any particle can be obtained by summing the relevant properties of all the particles which are situated within the range of the kernel of the Kernel function W.

At block 107, for each respective particle of the discrete particles, a corresponding trajectory is simulated. Then, at block 109, using the corresponding trajectory for each of the discrete particles, a first solution is formulated for simulating transport within the fluid. A predicted error for the first solution is determined at block 111. Next, at block 113, an iterative adjustment is performed by automatically adjusting at least one of: a quantity for n, the smoothing length, or the one or more corresponding properties, to formulate a second solution for simulating transport with the fluid. A predicted error is determined for the second solution at block 115. Then, at block 117, a test is performed to ascertain whether or not the predicted error is within a predefined, predetermined, or specified boundary. If so, the second solution is taken as a final solution (block 119). The negative branch from block 117 loops back to block 113.

According to a further set of embodiments, the first predicted error at block 111 and the second predicted error at block 115 are determined using a measure of accuracy in accordance with the following procedure.

Use Mean Integrated Square Error (MISE) as Measure of Accuracy:

$$\int_v [E\{\rho_N(\vec{x})\} - \rho(\vec{x})]^2 d\vec{x} + \int_v E\{[\rho_N(\vec{x}) - E\{\rho_N(\vec{x})\}]^2\} d\vec{x},$$

where E{ } denotes the operator of statistical expectation.

Under normality assumptions we can relate accuracy to the smoothing parameter, h, and the number of particles N:

$$MISE^*[h(n)] = \frac{1}{2\sqrt{\pi}\,\sigma} \cdot \left[\frac{3\beta^{*-4}}{32} + \beta^{*-1} N^{-2/5}\right] N^{-4/5},$$

where β* is a parameter that depends on the type of kernel and on the smoothing parameter in such a way to minimize MISE. The decision variables N and h can then be optimized by solving the following problem:

$$N(t) = \operatorname{argmin}_N \{MISE(N) + \alpha N^2\} \; MISE(N) \leq \varepsilon \; h(N) \leq \zeta h(t)$$
$$= \beta^* \hat{\sigma} N^{-1/(d+4)},$$

Where ε and ζ are user-defined constraints of desired error (based on MISE) and resolution (related to smoothing parameter). The parameter a is a user-defined penalty for the number of particles and therefore the computational complexity of the Lagrangian model. According to a set of further embodiments, observations of the fluid are continuously or repeatedly collected during the simulating of the corresponding trajectory, the formulating of the first solution for simulating transport within the fluid, and the formulating of the second solution for simulating transport within the fluid. Error can be optimized with respect to an observed concentration of a substance in the fluid using a mean square error (MSE) measurement instead of a mean integrated square error (MISE) measurement. The MSE approach does not provide an analytical formulation of accuracy (as in the case of MISE), but the MSE approach can use heuristics. For example, if the MSE or the h is high, the number of particles n is increased. Thus, the MSE may be used as a measure of accuracy using a set of heuristics, such that the quantity for n is increased in response to an increase in the mean square error from the first predicted error to the second predicted error.

Another set of further embodiments may be utilized in conjunction with non-Gaussian distributions. If an initial distribution is known, tuning of n and/or h may be performed such that MISE is minimized Yet another set of further embodiments may be utilized in situations where n and h are not uniform. The domain of all particles is divided into a plurality of sub-domains. A user specifies a desired accuracy and a desired resolution in each of the plurality of sub-domains. Then optimization of the second solution is solved separately in each sub-domain. For example, the procedures of FIG. 1 may be performed separately for each of the sub-domains.

The procedure of FIG. 1 automatically configures the particle modeling step of block 101 so that a user need not guess or estimate an appropriate value for the number of particles n. A user-defined level of performance may be provided as an input to the procedure, but this performance level is not a consequence of choices previously made by the user. Moreover, the user does not need to run many simulations in order to find an optimal trade-off between the number of particles n, an achieved resolution using the smoothing length h, and accuracy. Relatively little user experience is required to achieve an optimal setup.

The number of particles n may be adapted to a current status of the simulation. Computational resources are increased or decreased as needed. For example, a pollutant may be spreading to more areas of the domain, resulting in fewer empty volumes. Highly non-stationary situations can make initial/static guesses of n even more obscure to the user.

Figure 2:
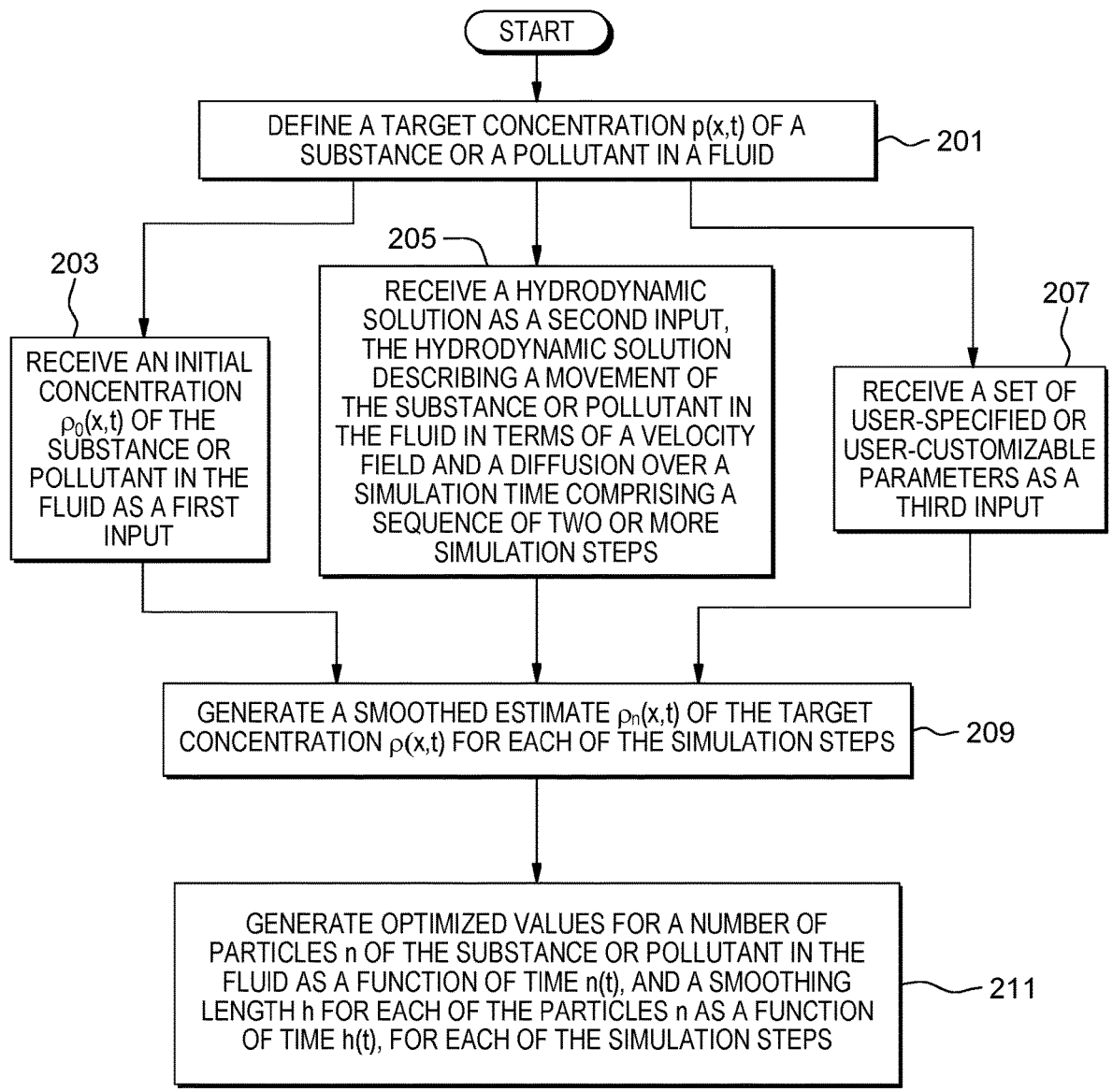
FIG. 2 illustrates a second exemplary method for adaptively optimizing a smooth particle hydrodynamics procedure, in accordance with one or more embodiments of the present invention.

FIG. 2 illustrates a second exemplary method for adaptively optimizing a smooth particle hydrodynamics procedure, in accordance with one or more embodiments of the present invention. The method of FIG. 2 performs a simulation of evolution of concentration of a pollutant or other substance throughout a fluid. At block 201, a target concentration of the pollutant or other substance is defined as $\rho(x,t)$. Next, at block 203, an initial concentration $\rho_0(x,t)$ of the substance or pollutant in the fluid is received as a first input. At block 205, a hydrodynamic solution is received as a second input. The hydrodynamic solution describes a movement of the substance or pollutant in the fluid in terms of a velocity field and a diffusion over a simulation time comprising a sequence of two or more simulation steps. The velocity field is a vector field used to mathematically describe the motion of the pollutant or other substance in the fluid. The vector field gives the velocity of an element or particle of the pollutant or other substance in the fluid at a position (x,y,z) and at a time t. At block 207, a set of user-specified or user-customizable parameters are received as a third input. These parameters may include any of a desired accuracy, a maximum error, a desired resolution, a maximum smoothing h, or a desired smoothing function, for the substance or pollutant in the fluid. It should be understood that blocks 203, 205, and 207 may be performed substantially contemporaneously or in any order.

The operational sequence progresses to block 209 where a smoothed estimate $\rho_n(x,t)$ of the target concentration $\rho(x,t)$ is generated for each of the simulation steps. Optimized values for the number of particles n of the pollutant or substance as a function of time n(t), and the smoothing length h for each of the particles n as a function of time h(t), are generated for each of the simulation steps (block 211).

Figure 3:
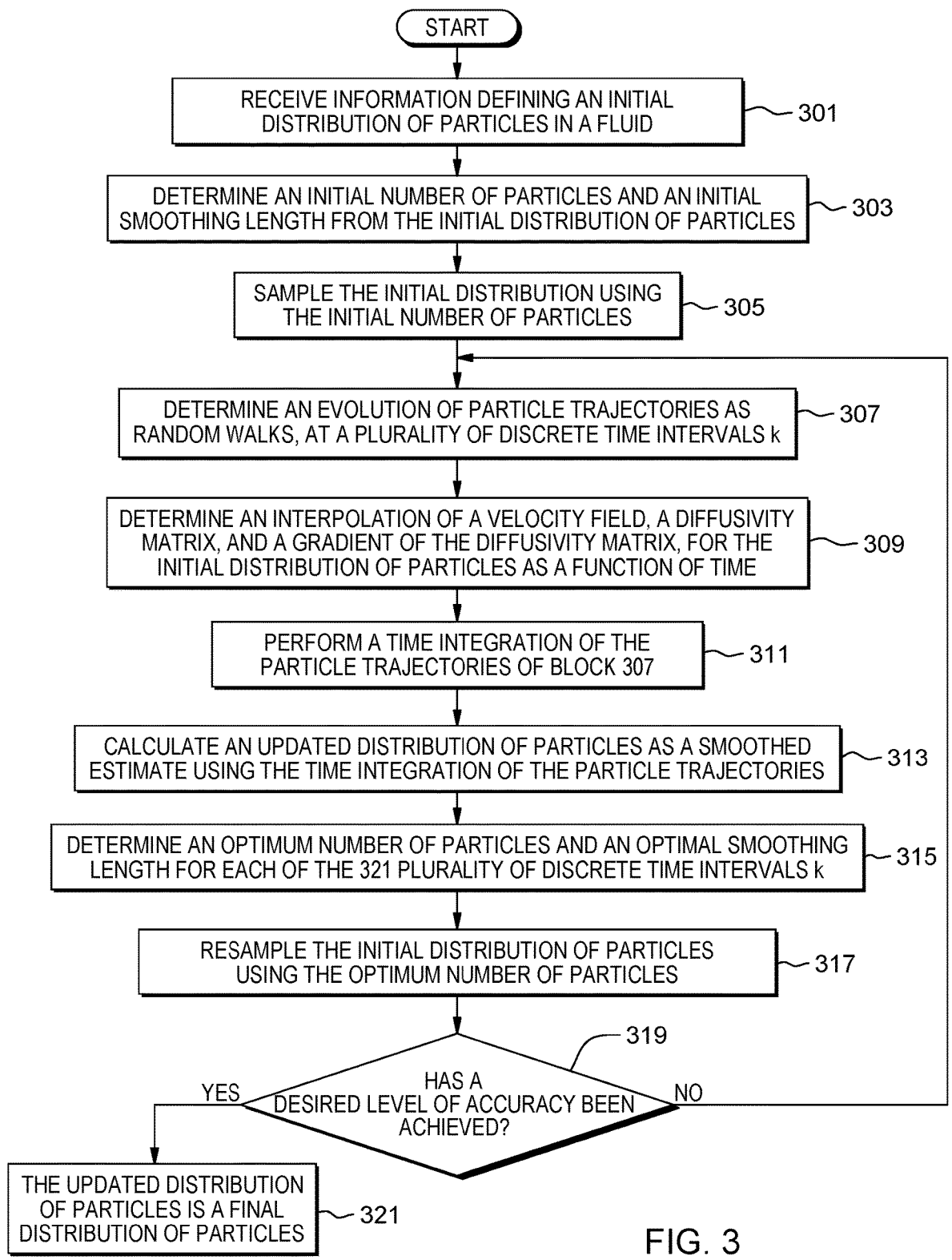
FIG. 3 illustrates a third exemplary method for adaptively optimizing a smooth particle hydrodynamics procedure, in accordance with one or more embodiments of the present invention.

FIG. 3 illustrates a third exemplary method for adaptively optimizing a smooth particle hydrodynamics procedure, in accordance with one or more embodiments of the present invention. The operational sequence commences at block 301 where information defining an initial distribution of particles in a fluid is received. An initial number of particles and an initial smoothing length are determined from the initial distribution of particles at block 303. Next, the initial distribution is sampled using the initial number of particles (block 305).

An evolution of particle trajectories, as random walks, is determined at a plurality of discrete time intervals k (block 307). Then, at block 309, an interpolation of a velocity field, a diffusivity matrix, and a gradient of the diffusivity matrix, is determined for the initial distribution of particles as a function of time. A time integration of particle trajectories is performed (block 311), and an updated distribution of particles is calculated as a smoothed estimate (block 313).

The operational sequence of FIG. 3 progresses to block 315 where an optimal number of particles and an optimal smoothing length are determined for each of the plurality of discrete time intervals k. The initial distribution of particles is resampled given the optimal number of particles (block 317). Next, at block 319, a test is performed to ascertain whether or not a desired level of accuracy has been achieved. If not, the operational sequence iteratively loops back to block 307 until a desired level of accuracy is achieved, or until a desired number of simulation iterations have been completed. The affirmative branch from block 319 leads to block 321 where the updated distribution of particles is a final distribution of particles.

Figure 4:
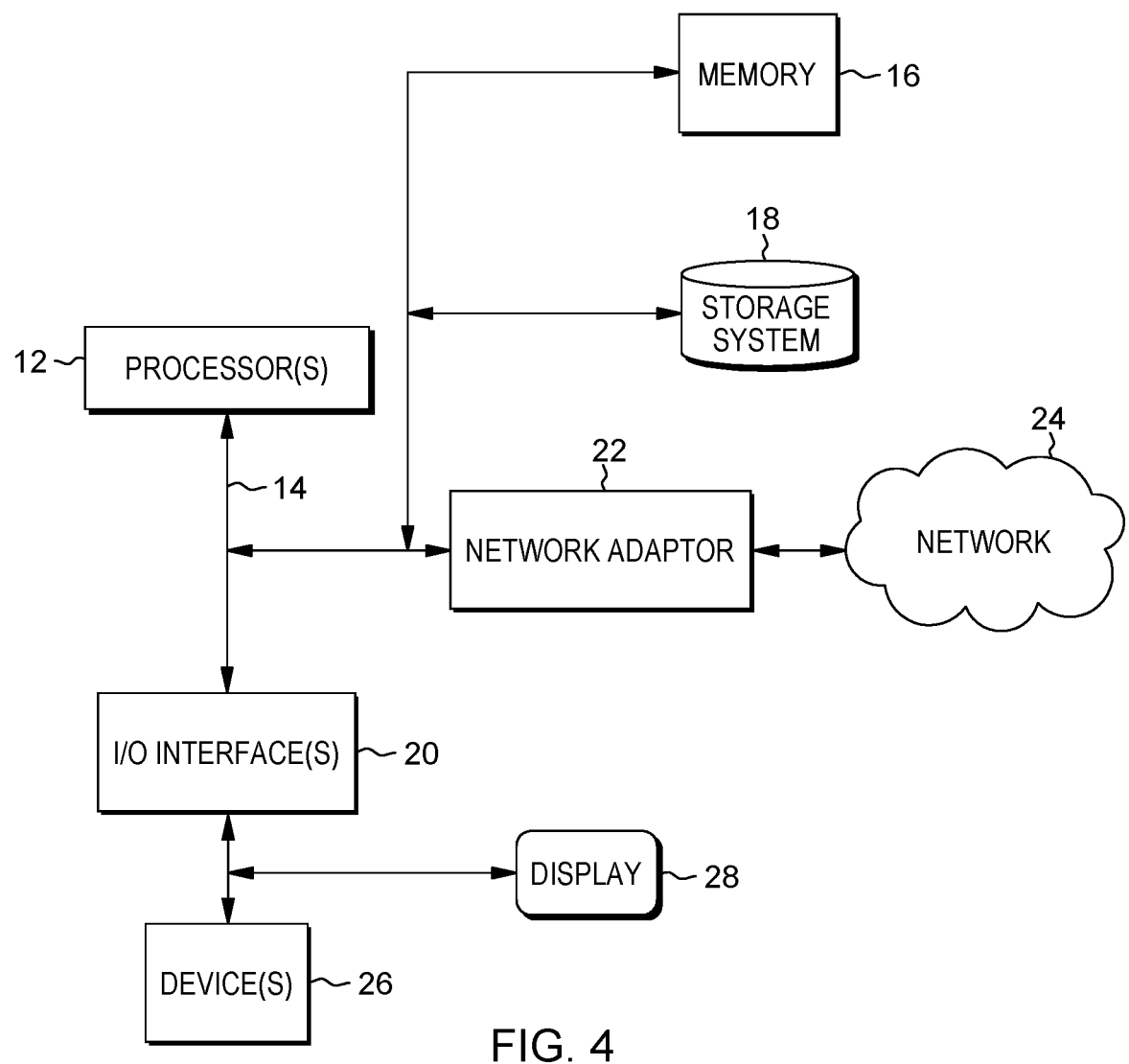
FIG. 4 illustrates an exemplary apparatus on which any of the methods of FIGS. 1-3 may be performed in accordance with one or more embodiments of the present invention.

FIG. 4 illustrates an exemplary apparatus on which any of the methods of FIG. 1, FIG. 2, or FIG. 3 may be performed in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    modeling a fluid as a set of n discrete particles, n being a positive integer;
    associating each of the discrete particles with one or more corresponding properties;
    associating each of the discrete particles with a corresponding spatial distance comprising a smoothing length over which the one or more corresponding properties are to be smoothed;
    for each respective particle of the discrete particles, simulating a corresponding trajectory;
    using the corresponding trajectory for each of the discrete particles to formulate a first solution for simulating transport within the fluid;
    determining a first predicted error for the first solution; and
    iteratively and automatically adjusting at least one of: the discrete particles quantity n or the smoothing length, to formulate a second solution for simulating transport with the fluid, and at each iteration, determining a second predicted error for the second solution, and continue said iterative and automatic adjusting of the at least one of: the discrete particles quantity n or the smoothing length and the determining a second predicted error until determining the second predicted error is within a predefined, predetermined, or specified boundary.

2. The computer-implemented method of claim 1 wherein the modeling further comprising using a Monte Carlo repeated random sampling procedure to determine a distribution and redistribution for the discrete particles.

3. The computer-implemented method of claim 2 wherein the Monte Carlo repeated random procedure comprises:
    defining a domain of possible inputs;
    generating a plurality of sets of candidate inputs randomly from a probability distribution over the domain;
    performing a deterministic computation on each of the plurality of sets of candidate inputs to generate a plurality of deterministic computations; and
    aggregating the plurality of deterministic computations to yield a numerical result comprising the distribution for the discrete particles.

4. The computer-implemented method of claim 1 wherein the one or more corresponding properties comprise at least one of: a location, a velocity, a diameter, a mass, a temperature, an identifier corresponding to a pollutant, a fuel composition, or a chemical composition.

5. The computer-implemented method of claim 1 wherein the first predicted error and the second predicted error are each determined using a mean integrated square error as a measure of accuracy.

6. The computer-implemented method of claim 1 wherein the first predicted error and the second predicted error are each determined using a mean square error as a measure of accuracy using a set of heuristics, said method further comprising: increasing the quantity of discrete particles n in response to determining an increase in the mean square error from the first predicted error to the second predicted error.

7. The computer-implemented method of claim 1 further comprising collecting one or more observations for the fluid continuously or repeatedly during the simulating of the corresponding trajectory, the formulating of the first solution for simulating transport within the fluid, and the formulating of the second solution for simulating transport within the fluid.

8. The computer-implemented method of claim 1 further comprising:
   determining that the set of n discrete particles and the smoothing length are non-uniform;
   dividing a domain comprising the set of n discrete particles into a plurality of sub-domains;
   receiving an input specifying a desired accuracy and a desired resolution in each of the plurality of sub-domains; and
   solving for an optimization of the second solution separately in each of the plurality of sub-domains.

9. A computer program product comprising a computer-readable storage medium having a computer-readable program stored therein, wherein the computer-readable program, when executed on a computing device including at least one processor, causes the at least one processor to:
   model a fluid as a set of n discrete particles, n being a positive integer;
   associate each of the discrete particles with one or more corresponding properties;
   associate each of the discrete particles with a corresponding spatial distance comprising a smoothing length over which the one or more corresponding properties are to be smoothed;
   for each respective particle of the discrete particles, simulate a corresponding trajectory;
   use the corresponding trajectory for each of the discrete particles to formulate a first solution for simulating transport within the fluid;
   determine a first predicted error for the first solution; and
   iteratively and automatically adjust at least one of: the discrete particles quantity n or the smoothing length, to formulate a second solution for simulating transport with the fluid, and at each iteration, determine a second predicted error for the second solution, and continue said iterative and automatic adjusting of the at least one of: the discrete particles quantity n or the smoothing length and the determining a second predicted error until determining the second predicted error is within a predefined, predetermined, or specified boundary.

10. The computer program product of claim 9 further configured for using a Monte Carlo repeated random sampling procedure to determine a distribution and re-distribution for the discrete particles.

11. The computer program product of claim 10 further configured for performing the Monte Carlo repeated random procedure by:
   defining a domain of possible inputs;
      generating a plurality of sets of candidate inputs randomly from a probability distribution over the domain;
      performing a deterministic computation on each of the plurality of sets of candidate inputs to generate a plurality of deterministic computations; and
      aggregating the plurality of deterministic computations to yield a numerical result comprising the distribution for the discrete particles.

12. The computer program product of claim 9 wherein the one or more corresponding properties comprise at least one of: a location, a velocity, a diameter, a mass, a temperature, an identifier corresponding to a pollutant, a fuel composition, or a chemical composition.

13. The computer program product of claim 9 further configured for determining the first predicted error and the second predicted error using a mean integrated square error as a measure of accuracy.

14. The computer program product of claim 9 further configured for determining the first predicted error and the second predicted error using a mean square error as a measure of accuracy, the at least one processor being further configured to: increase the quantity of discrete particles n in response to determining an increase in the mean square error from the first predicted error to the second predicted error.

15. The computer program product of claim 9 further configured for collecting one or more observations for the fluid continuously or repeatedly during the simulating of the corresponding trajectory, the formulating of the first solution for simulating transport within the fluid, and the formulating of the second solution for simulating transport within the fluid.

16. The computer program product of claim 9 further configured for:
   determining that the set of n discrete particles and the smoothing length are non-uniform;
   dividing a domain comprising the set of n discrete particles into a plurality of sub-domains;
   receiving an input specifying a desired accuracy and a desired resolution in each of the plurality of sub-domains; and
   solving for an optimization of the second solution separately in each of the plurality of sub-domains.

17. An apparatus comprising a processor and a memory coupled to the processor, wherein the memory comprises instructions which, when executed by the processor, cause the processor to:
   model a fluid as a set of n discrete particles, n being a positive integer;
   associate each of the discrete particles with one or more corresponding properties;
   associate each of the discrete particles with a corresponding spatial distance comprising a smoothing length over which the one or more corresponding properties are to be smoothed;
   for each respective particle of the discrete particles, simulate a corresponding trajectory;
   use the corresponding trajectory for each of the discrete particles to formulate a first solution for simulating transport within the fluid;
   determine a first predicted error for the first solution; and
   iteratively and automatically adjust at least one of: the discrete particles quantity n or the smoothing length to formulate a second solution for simulating transport with the fluid, and at each iteration, determine a second predicted error for the second solution, and continue said iterative and automatic adjusting of the at least one of: the discrete particles quantity n or the smoothing length and the determining a second predicted error until determining the second predicted error is within a predefined, predetermined, or specified boundary.

18. The apparatus of claim 17 further configured for using a Monte Carlo repeated random sampling procedure to determine a distribution and redistribution for the discrete particles.

19. The apparatus of claim 18 further configured for performing the Monte Carlo repeated random procedure by:
   defining a domain of possible inputs;
   generating a plurality of sets of candidate inputs randomly from a probability distribution over the domain;

performing a deterministic computation on each of the plurality of sets of candidate inputs to generate a plurality of deterministic computations; and aggregating the plurality of deterministic computations to yield a numerical result comprising the distribution for the discrete particles.

20. The apparatus of claim 17 wherein the one or more corresponding properties comprise at least one of: a location, a velocity, a diameter, a mass, a temperature, an identifier corresponding to a pollutant, a fuel composition, or a chemical composition.

* * * * *